(12) United States Patent
Yasunaga

(10) Patent No.: US 9,539,861 B2
(45) Date of Patent: Jan. 10, 2017

(54) PNEUMATIC TIRE

(75) Inventor: Toshikazu Yasunaga, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 59 days.

(21) Appl. No.: 13/610,037

(22) Filed: Sep. 11, 2012

(65) Prior Publication Data

US 2013/0075001 A1 Mar. 28, 2013

(30) Foreign Application Priority Data

Sep. 26, 2011 (JP) .................. 2011-209282

(51) Int. Cl.
*B60C 11/12* (2006.01)
*B60C 11/13* (2006.01)
*B60C 11/03* (2006.01)

(52) U.S. Cl.
CPC ........ *B60C 11/0306* (2013.04); *B60C 11/0304* (2013.04); *B60C 11/125* (2013.04); *B60C 11/1259* (2013.04); *B60C 11/1272* (2013.04); *B60C 11/13* (2013.01); *B60C 11/12* (2013.01); *B60C 11/1236* (2013.04); *B60C 2011/0383* (2013.04); *B60C 2011/0388* (2013.04); *B60C 2011/129* (2013.04); *B60C 2011/1209* (2013.04)

(58) Field of Classification Search
CPC .. B60C 11/042; B60C 11/1236; B60C 11/125; B60C 2011/0381; B60C 2011/0383; B60C 2011/1268; B60C 11/04; B60C 2011/129; B60C 2011/1209; B60C 11/1259; B60C 11/12; B60C 2011/1295; B60C 2011/1254

USPC .............. 152/209.18, DIG. 3, 209.8, DIG. 4
See application file for complete search history.

(56) References Cited

U.S. PATENT DOCUMENTS

| 1,201,744 | A | * | 10/1916 | Kremer ..................... 152/209.18 |
| 2,781,815 | A | * | 2/1957 | Davis ........................ 152/209.1 |
| 2006/0162832 | A1 | * | 7/2006 | Stuhldreher ............. 152/209.18 |
| 2007/0151645 | A1 | * | 7/2007 | Mathews ................. 152/209.18 |
| 2013/0037191 | A1 | * | 2/2013 | Suzuki ..................... B60C 11/04 |
| | | | | 152/209.9 |

FOREIGN PATENT DOCUMENTS

| DE | 3539530 A | * | 5/1986 | ............. B60C 11/04 |
| GB | 000527015 A | * | 10/1940 | ............. B60C 11/01 |
| JP | 04047907 A | * | 2/1992 | ............. B60C 11/06 |
| JP | 05-112107 A | | 5/1993 | |

(Continued)

OTHER PUBLICATIONS

Machine Translation: DE3539530A1; Takeuchi, Akihiro et al.; (no date).*

(Continued)

*Primary Examiner* — Michael H Wilson
*Assistant Examiner* — Kendra Ly
(74) *Attorney, Agent, or Firm* — Westerman, Hattori, Daniels & Adrian, LLP

(57) ABSTRACT

Sipe groups including a plurality of sipes which is opened to a main groove and is arranged at intervals in a tire circumferential direction are formed in both land parts with the main groove being interposed therebetween. The sipe groups are arranged at intervals in the tire circumferential direction, and are shifted in the tire circumferential direction on both sides of the main groove.

3 Claims, 7 Drawing Sheets

(56) References Cited

FOREIGN PATENT DOCUMENTS

| JP | 2002-264614 A |   | 9/2002 |   |
|----|---------------|---|--------|---|
| JP | 2003-063213 A |   | 3/2003 |   |
| JP | 2009-286276 A |   | 12/2009 |   |
| KR | 2005089377 A | * | 9/2005 | ............. B60C 11/03 |
| KR | 20100052683 A | * | 5/2010 |   |

OTHER PUBLICATIONS

Machine Translation: KR 2005089377 A; Choi G N et al.; no date.*
Machine Translation: KR20100052683; Joo Sang Tak; no date.*
English Translation of Office Action dated Jun. 12, 2014, issued in corresponding Chinese Patent Application No. 201210289783.0 (5 pages).

* cited by examiner

PNEUMATIC TIRE

BACKGROUND OF THE INVENTION

Field of the Invention

The present invention relates to a pneumatic tire, and more particularly, to a pneumatic tire in which sipes are formed in a land part of a tread part.

Background Art

In the related art, cuts which are called sipes are formed in a land part such as a block or rib provided in a tread part of a pneumatic tire. The sipes have the edge effect or water removal effect, and enhance travelling performance and braking performance in an ice/snow road surface or the like (hereinafter, referred to as snow performance), which are disclosed in JP-A-2002-264614, JP-A-2003-63213, JP-A-2009-286276 and JP-A-5-112107, for example.

SUMMARY OF THE INVENTION

However, in a pneumatic tire disclosed in the above-mentioned documents, sipes formed in land parts are arranged at approximately regular intervals along a groove and are arranged approximately evenly in both of the land parts with the groove being interposed therebetween, and the stiffness of both side walls of the groove is approximately the same. Thus, even if the sipes formed in one side wall capture, in portions (sipe edges) thereof which are opened to the groove, ice and snow which enter the groove, it is difficult to tightly hold the captured ice and snow at the other side wall, and thus, a sufficient scratch effect (edge effect) is not obtained, which results in room for further improvement in the snow performance.

Further, if the number of sipes is increased to increase the sipe density, the locations which capture ice and snow are increased to enhance the edge effect, but the stiffness of the entire land part is decreased, and the travelling performance and the braking performance on a dry road surface (hereinafter, referred to as dry performance) are decreased.

The invention has been achieved in consideration of the above problems, and an object of the invention is to provide a pneumatic tire in which the snow performance and the dry performance are compatible.

According to an embodiment of the invention, there is provided a pneumatic tire which includes a main groove extending along a tire circumferential direction and land parts formed on both sides of the main groove in a tread part, including a sipe group including a plurality of sipes which are opened to the main groove and are arranged at intervals in the tire circumferential direction, wherein the sipe groups are formed at intervals in the tire circumferential direction in both of the land parts with the main groove being interposed therebetween, and are shifted in the tire circumferential direction on both sides of the main groove.

DETAILED DESCRIPTION OF THE INVENTION

First Embodiment

A pneumatic tire according to the present embodiment includes, although not shown, a pair of right and left bead parts and a pair of right and left side wall parts, and a tread part 10 which is disposed between both the side wall parts so as to connect radial outer edge parts of the pair of right and left side wall parts. The pneumatic tire includes a carcass which extends across the pair of bead parts.

The carcass includes at least one carcass ply in which both end parts are engaged by a bead core embedded in the bead parts through the side wall parts from the tread part 10, and reinforces the above-mentioned respective parts.

On the outer circumferential side of the carcass in the tread part 10, a belt which includes two or more steel coated layers which are coated with rubber is installed to reinforce the tread part 10 in the outer circumference of the carcass.

Figure 1:
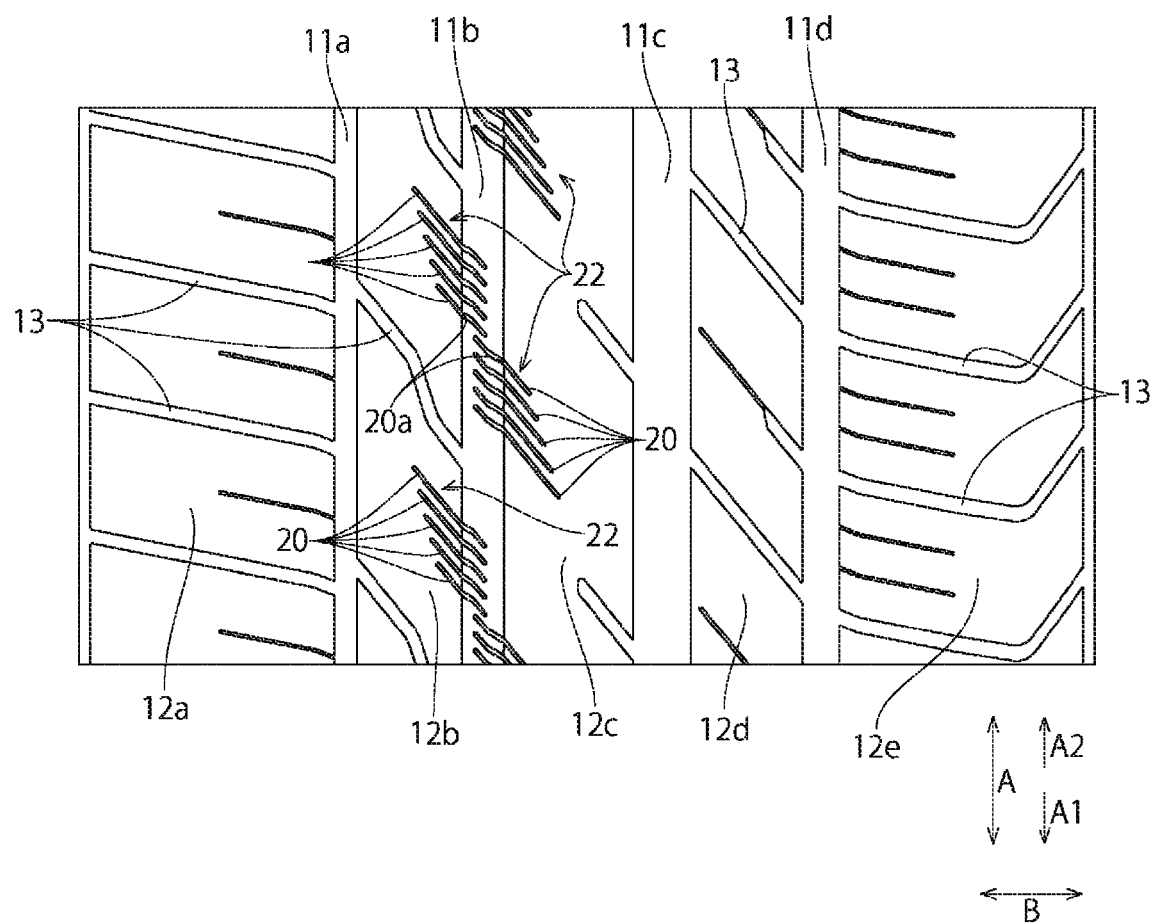
FIG. 1 is an expanded plan view of a tread pattern of a pneumatic tire according to a first embodiment.

As shown in FIG. 1, four main grooves 11a, 11b, 11c and 11d which extend along a tire circumferential direction A, and five land parts 12a, 12b, 12c, 12d and 12e which are divided by the main grooves 11a, 11b, 11c and 11d are formed on the surface of the tread part 10.

Specifically, the shoulder land parts 12a and 12e which are disposed on the outside in the tire width direction with respect to the main grooves 11a and 11d which are disposed on the outermost side, the central land part 12c which is interposed between the main grooves 11b and 11c and is disposed approximately at the center in the tire width direction, and the mediate land parts 12b and 12d which are disposed between the central land part 12c and the shoulder land parts 12a and 12e are formed in the tread part 10.

The central land part 12c includes a rib which continuously extends in the tire circumferential direction A, and the other land parts 12a, 12b, 12d and 12e include a block array in which a plurality of blocks divided by transverse grooves 13 are arranged in the tire circumferential direction A.

A sipe group 22 which includes a plurality of sipes 20 is formed on the central land part 12c and one mediate land part 12b which face each other with the main groove 11b being interposed therebetween.

Figure 2:
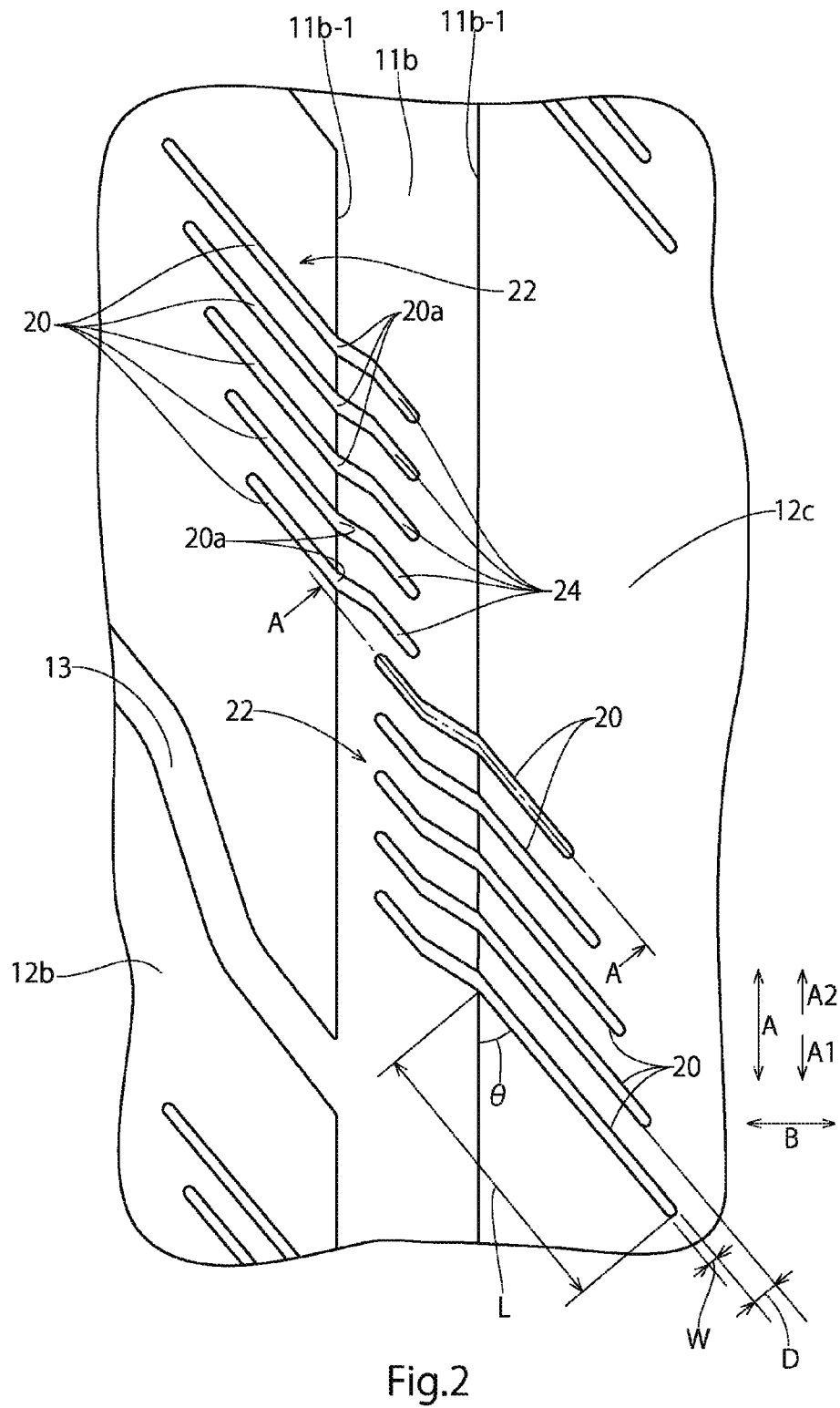
FIG. 2 is an enlarged view of a main part in FIG. 1.

As shown in FIGS. 1 and 2, the sipe group 22 includes the plurality of sipes 20 which extend along a direction which intersects the tire circumferential direction A and is opened to the main groove 11b. In the present embodiment, the sipe group 22 includes five sipes 20, but the number is not particularly limited as long as it is more than one. Here, the sipe group 22 preferably includes three or more sipes 20.

Figure 3:
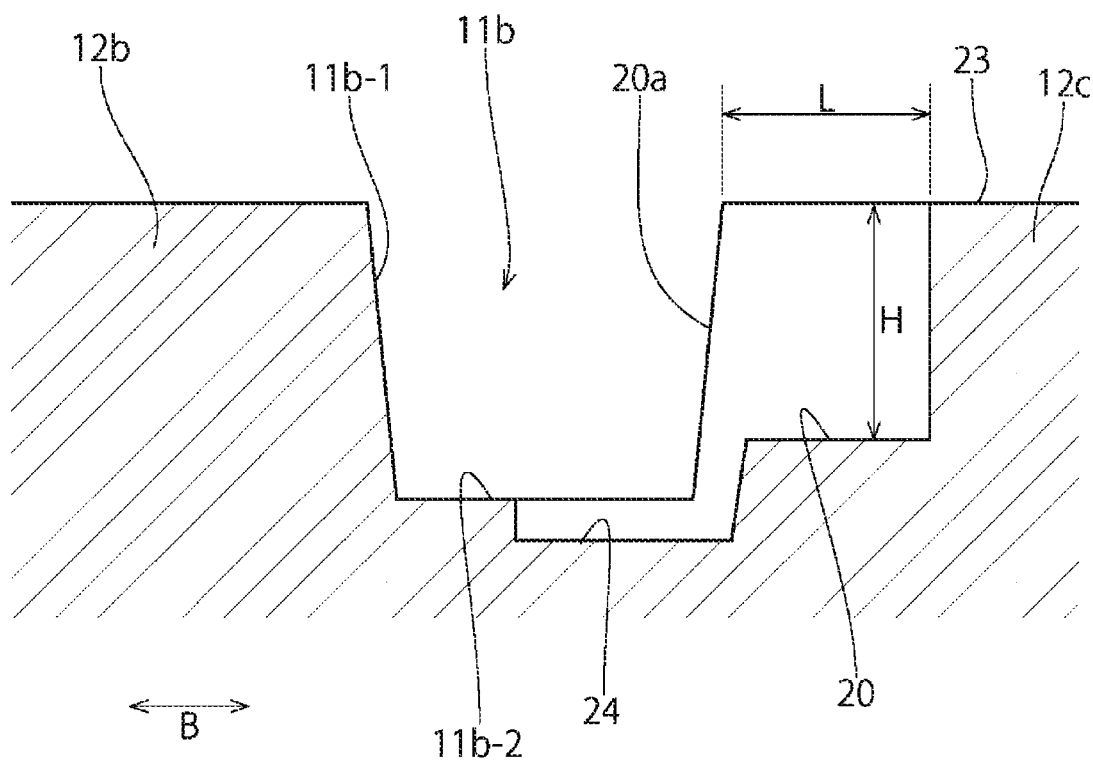
FIG. 3 is a cross-sectional view taken along line A-A in FIG. 2.

The plurality of sipes 20 which forms the sipe group 22 formed in the central land part 12c is formed at an interval D in the tire circumferential direction A so that the lengths L (hereinafter, referred to as "sipe lengths") which are opened to a tread surface 23 are gradually increased along one tire circumferential direction A1. In this example, the sipes 20 extend in an inclined direction with respect to the main groove 11b from a side wall 11b-1 of the main groove 11b, but may extend in parallel with a tire width direction B. As shown in FIG. 3, the sipe 20 extends in a depth direction of the main groove 11b from the tread surface 23, and leads to a sipe 24 which is formed in a groove bottom 11b-2 of the main groove 11b.

An example of various sizes of the plurality of sipes 20 which form the sipe group 22 will be described with reference to FIGS. 2 and 3. The sipe width W may be 0.3 mm to 1.5 mm, the sipe length L may be 3 mm or more, the depth H of the sipe 20 may be 0.5 mm or more and 90% or less of the depth of the main groove 11b, the interval D between the sipes 20 which are adjacent to each other in the tire circumferential direction A may be 1 to 8 mm, and the inclined angle of the sipe 20 with respect to the main groove 11b is 10° to 90°. Further, according to the present embodiment, in a case where the sipe lengths L are different from each other in the sipe group 22, the shortest sipe length L may be 3 mm or more, and the longest sipe length L may be 1.2 times or more the shortest sipe length.

In a similar way to the central land part 12c, in the mediate land part 12b which is adjacent to the central land part 12c with the main groove 11b being interposed therebetween, the sipe groups 22 as described above are formed over the entire circumference of the tread part 10 at intervals in the tire circumferential direction A.

The sipe groups 22 which are formed in the mediate land part 12b are shifted in the tire circumferential direction A with respect to the sipe groups 22 which are formed in the central land part 12c, and portions (sipe edges) 20a, which are opened to the main groove 11b, of the sipes 20 which form the sipe group 22 formed in the central land part 12c and the sipe edges 20a of the sipes 20 which form the sipe group 22 formed in the mediate land part 12b do not face each other in the tire width direction B.

That is, in a position which faces the sipe edges 20a of the sipe group 22 formed in the central land part 12c in the tire width direction B with the main groove 11b being interposed therebetween, the sipe edges 20a of the sipe group 22 formed in the mediate land part 12b are not present, and in a position which faces the sipe edges 20a of the sipe group 22 formed in the mediate land part 12b in the tire width direction B with the main groove 11b being interposed therebetween, the sipe edges 20a of the sipe group 22 formed in the central land part 12c are not present.

Further, when the tread pattern as shown in FIG. 1 is indicated in an expanded plan view, the sipe group 22 formed in the mediate land part 12b is formed to match a shape in which the sipe group 22 formed in the central land part 12c is rotated by 180° in an extended plane. That is, the inclined direction of the sipes 20 formed in the central land part 12c is the same as the inclined direction of the sipes 20 formed in the mediate land part 12b, and the lengths L which are opened to the tread surface 23 of the sipes 20 which form the sipe group 22 formed in the mediate land part 12b are gradually increased along the other tire circumferential direction A2.

In the above-described pneumatic tire, the sipe groups 22 formed in both of the central land part 12c and the mediate land part 12b with the main groove 11b being interposed therebetween are shifted in the tire circumferential direction A, and the sipe edges 20a of the sipe group 22 formed in the central land part 12c and the sipe edges 20a of the sipe group 22 formed in the mediate land part 12b do not face each other in the tire width direction B. Thus, as the sipes 20 which form the sipe group 22 are opened to the tread surface 23, it is possible to enhance the edge effect. Further, in the sipe edges 20a formed in the central land part 12c and the sipe edges 20a formed in the mediate land part 12b, it is possible to scratch and capture ice and snow which is entered into the main groove 11b, and to tightly hold the ice and snow captured in the sipe edges 20a at the side wall 11b-1 of the main groove 11b having relatively high stiffness where the sipe edges 20a are not present. As a result, it is possible to enhance the edge effect without increasing the number of the sipes 20, and to enhance the snow performance while securing the dry performance.

Further, in the present embodiment, since the sipes 20 are inclined with respect to the main groove 11b, it is easy to scratch ice and snow which is entered into the main groove 11b, and thus, it is possible to further increase the edge effect to enhance the snow performance.

Further, according to the present embodiment, as the inclined direction of the sipes 20 formed in the central land part 12c is the same as the inclined direction of the sipes 20 formed in the mediate land part 12b, even though the tire installation direction is changed, it is possible to uniformize the inclined angle of the sipes 20 with respect to the tire rotation direction, and thus, it is possible to apply the invention to a non-directional tire in which the tire rotation direction is not fixed.

Further, in the present embodiment, as the sipe lengths L of the plurality of sipes 20 which forms the sipe group 22 are gradually increased along one tire circumferential direction A1, it is possible to give a stiffness difference so that the stiffness is gradually lowered from the short sipe 20 to the long sipe 20 in regions of the land parts 12b and 12c where the sipe groups 22 are formed. Thus, in the present embodiment, the ice and snow captured in the sipe edges 20a are transmitted to a region in which the stiffness is low (that is, a region in which the long sipe 20 is formed), and are easily discharged from the main groove 11b when the land parts 12b and 12c are separated from a ground surface.

Second Embodiment

In the first embodiment, the depths H of the sipes 20 are the same in the plurality of sipes 20 which forms the sipe group 22, but in this embodiment, the depths H of the plurality of sipes 20 which forms the sipe group 22 are different from each other. That is, the sipe 20 having a large depth H and the sipe 20 having a small depth H are alternately formed. The other configurations are the same as in the first embodiment, and the same effect is obtained.

Other Embodiments

In the above-described embodiments, the plurality of sipes 20 which forms the sipe group 22 is inclined with respect to the main groove 11b and the sipe lengths L are gradually increased in the tire circumferential direction A, but all the sipe lengths L of the sipes 20 may be the same, or may be formed perpendicularly to the main groove 11b.

Further, in the above-described embodiments, a case in which the sipe groups 22 are formed in the central land part 12c and the mediate land part 12b face each other with the main groove 11b being interposed therebetween is described, but the sipe groups 22 may be formed in both of the land parts with the other main grooves 11a, 11c and 11d being interposed therebetween to be shifted in the tire circumferential direction A.

Further, the pneumatic tire according to the above-described embodiments is excellent in snow performance and is thus suitable for a winter tire such as a studless tire, an all-season tire, or the like, but may also be applied to a summer tire. In addition, although not illustrated in detail, various modifications may be made as long as they do not depart from the spirit of the invention.

EXAMPLES

Hereinafter, examples which specifically show the configuration and effect of the invention will be described. Respective tire performance tests were made as follows.

(1) Snow Performance

A test tire (size: 225/40R18) was installed to an actual vehicle (3000 cc FR sedan made in Japan), and the vehicle travelled on a snow road surface under the loading condition of one passenger. Straight driving, circling, braking and the like were carried out, and stability, cornering ability, and braking performance were evaluated by a sensory test by a driver. Taking the result of Comparative Example to be 100, index evaluation was performed. If the index is large, it indicates that the snow performance is excellent.

(2) Snow Removal Performance

In evaluation of snow removal performance, a CCD camera was installed on the vehicle front side of a tire mounted on a driving shaft, and the area ratio of snow attached to a tread pattern just before grounding was measured. Taking the result of Comparative Example to be 100, index evaluation was performed. If the index is large, it indicates that the snow performance is excellent.

Figure 4A:
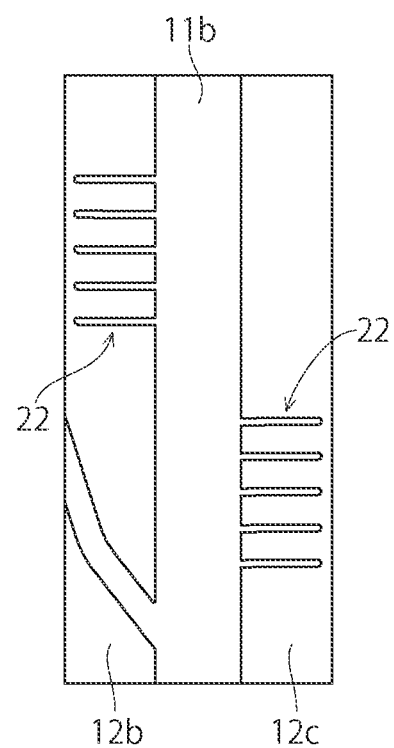
FIG. 4A is a plan view illustrating a sipe group of a pneumatic tire according to another embodiment.
Figure 4B:
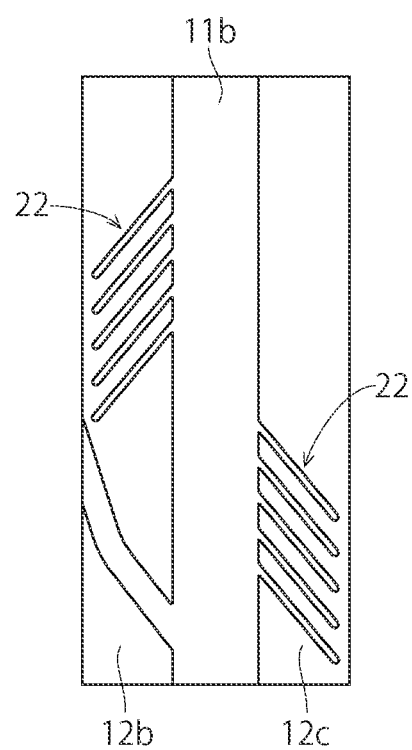
FIG. 4B is a plan view illustrating a sipe group of a pneumatic tire according to still another embodiment.
Figure 4C:
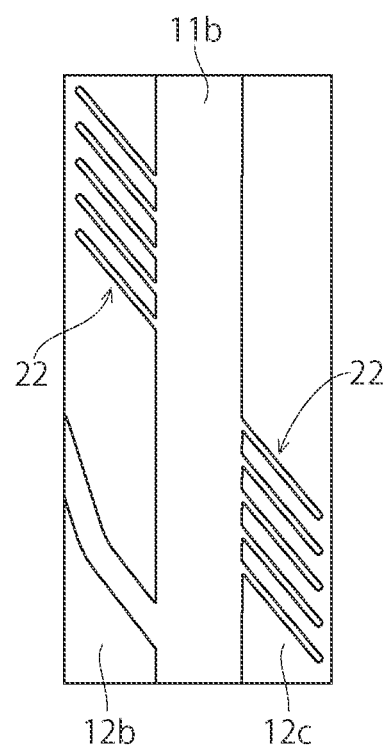
FIG. 4C is a plan view illustrating a sipe group of a pneumatic tire according to yet another embodiment.
Figure 5:
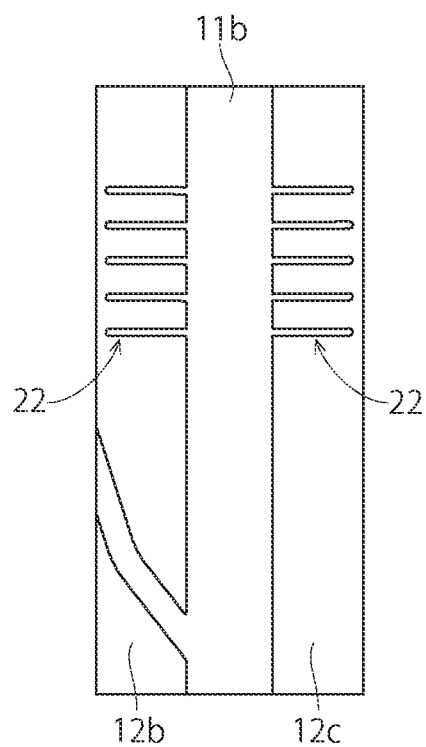
FIG. 5 is a plan view illustrating a sipe group of a pneumatic tire according to a comparative example.

A pneumatic tire having the tread pattern shown in FIG. 1 was manufactured as Example 1, pneumatic tires having tread patterns shown in FIGS. 4A, 4B and 4C were manufactured as Examples 2 to 4, and a pneumatic tire having a tread pattern shown in FIG. 5 was manufactured as Comparative Example. Various dimensions of sipe groups formed in the pneumatic tires of Examples 1 to 4 and Comparative Example are written in Table 1.

The above-mentioned respective performance evaluations were performed for the pneumatic tires of Examples 1 to 4 and Comparative Example, and the results are shown in Table 1.

TABLE 1

| | Example 1 | Example 2 | Example 3 | Example 4 | Comparative Example |
|---|---|---|---|---|---|
| Configuration of sipe group | FIG. 1 | FIG. 4A | FIG. 4B | FIG. 4C | FIG. 5 |
| Sipe width W (mm) | 0.8 | 0.8 | 0.8 | 0.8 | 0.8 |
| Sipe interval D (mm) | 2.5 | 3.9 | 2.5 | 2.5 | 3.9 |
| Sipe depth H (mm) | 6.5 | 6.5 | 6.5 | 6.5 | 6.5 |
| Inclined angle θ | 40 | 90 | 40 | 40 | 90 |
| Sipe length L (mm) | 9-18 | 9 | 13.5 | 13.5 | 9 |
| Snow performance | 105 | 103 | 105 | 104 | 100 |
| Snow removal performance | 102 | 100 | 100 | 100 | 100 |

From the result of table 1, it can be seen that the pneumatic tires of Examples 1 to 4 have enhanced snow performance, compared with the pneumatic tire of Comparative Example. Further, it can be understood that in addition to the snow performance, the snow removal performance is also enhanced in Example 1, compared with Comparative Example.

What is claimed is:

1. A pneumatic tire, comprising:
   a main groove extending linearly along an entire tire circumferential direction;
   a plurality of land parts formed in a tread part of the pneumatic tire and extending along the tire circumferential direction, a first one of said plurality of land parts formed on one side of the main groove and a second one of said plurality of land parts formed on an opposite side of the main groove; and
   a plurality of sipe groups, a first one of said plurality of sipe groups formed in the first one of said plurality of land parts and a second one of said plurality of sipe groups formed in the second one of said plurality of land parts, wherein
   each of said plurality of sipe groups comprises a plurality of sipes which open the main groove, the main groove is located between said first one of said plurality of land parts and said second one of said plurality of land parts, and
   said first one of said plurality of sipe groups is entirely offset in the tire circumferential direction with respect to said second plurality of sipe groups,
   wherein the first one of the plurality of said sipe groups and the second one of the plurality of said sipe groups do not face each other in a tire width direction with the main groove being interposed therebetween,
   wherein an interval in the tire circumferential direction between the first one of the plurality of said sipe groups and the second one of the plurality of said sipe groups is larger than an interval in the tire circumferential direction between the plurality of sipes forming the first sipe group or the plurality of sipes forming the second sipe group,
   none of the plurality of sipe groups is arranged opposite and parallel across the main groove from the first one of said plurality of sipe groups,
   no sipe is formed, which does not belong to any of the plurality of sipe groups, between a first sipe group and a second sipe group adjacent to each other in the tire circumferential direction,
   the plurality of sipes of each of the plurality of sipe groups are all inclined in the same direction with respect to the main groove,
   each of the plurality of sipe groups comprises three or more sipes,
   the sipe width is 0.3 mm to 1.5 mm,
   the sipe length is 3 mm or more, and
   the sipes which form the sipe groups are opened to portions of the main groove.

2. The pneumatic tire according to claim 1, wherein the plurality of sipes which forms each of the plurality of sipe groups has lengths which are gradually increasing along one tire circumferential direction.

3. The pneumatic tire according to claim 1, wherein the plurality of sipes are opened to a tread surface.

* * * * *